United States Patent
Smallwood et al.

(10) Patent No.: US 12,503,978 B1
(45) Date of Patent: Dec. 23, 2025

(54) INLETS FOR GAS TURBINE ENGINE FANS WITH DISTORTION TOLERANCE

(71) Applicant: Rolls-Royce North American Technologies Inc., Indianapolis, IN (US)

(72) Inventors: Michel S. Smallwood, Indianapolis, IN (US); Robert W. Heeter, Indianapolis, IN (US); Daniel E. Molnar, Jr., Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/751,001

(22) Filed: Jun. 21, 2024

(51) Int. Cl.
| | |
|---|---|
| *F02C 6/20* | (2006.01) |
| *F01D 17/00* | (2006.01) |
| *F02C 7/042* | (2006.01) |
| *F02C 7/057* | (2006.01) |
| *F02C 9/20* | (2006.01) |

(52) U.S. Cl.
CPC .............. *F02C 7/042* (2013.01); *F01D 17/00* (2013.01); *F02C 6/20* (2013.01); *F02C 7/057* (2013.01); *F02C 9/20* (2013.01); *F05D 2220/323* (2013.01)

(58) Field of Classification Search
CPC . F02C 7/057; F02C 7/042; F02C 7/04; B64D 2033/0226; B64D 2033/0253; B64D 2033/026; B64D 33/02; F05D 2270/1022; F02K 1/165
See application file for complete search history.

(56) References Cited

U.S. PATENT DOCUMENTS

| | | | |
|---|---|---|---|
| 4,655,413 A * | 4/1987 | Genssler | ................. F02C 7/042 137/15.1 |
| 6,390,414 B1 * | 5/2002 | Medvedev | ............ B64D 33/02 244/53 B |
| 6,655,632 B1 | 12/2003 | Gypta et al. | |
| 7,637,455 B2 | 12/2009 | Silkey et al. | |
| 7,926,290 B2 | 4/2011 | Johnson | |
| 7,975,961 B2 | 7/2011 | Silkey et al. | |
| 9,964,038 B2 | 5/2018 | Huynh | |
| 10,190,539 B2 | 1/2019 | Bowcutt et al. | |
| 10,704,418 B2 | 7/2020 | Ramakrishnan et al. | |
| 11,149,639 B2 | 10/2021 | Duge | |
| 11,620,415 B2 | 4/2023 | Ferrar et al. | |

(Continued)

FOREIGN PATENT DOCUMENTS

| | | |
|---|---|---|
| EP | 4339436 | 3/2024 |
| GB | 2162582 | * 10/1979 |
| WO | 2020113110 | 6/2020 |

*Primary Examiner* — Gerald L Sung
*Assistant Examiner* — Roberto Toshiharu Igue
(74) *Attorney, Agent, or Firm* — Barnes & Thornburg

(57) ABSTRACT

An aircraft includes a duct system, a gas turbine engine, and an inlet flow regulation system. The duct system includes a main duct, a first inlet duct in fluid communication with the main duct, and a second inlet duct in fluid communication with the main duct. The inlet flow regulation system includes an inlet flow regulator configured to manage different flow characteristics of a flow of air entering the first and second inlet ducts to form a substantially uniform flow distribution through the main duct and into the gas turbine engine and a control unit in communication with the inlet flow regulator and configured to selectively move the inlet flow regulator.

18 Claims, 9 Drawing Sheets

(56) References Cited

U.S. PATENT DOCUMENTS

| | | | |
|---|---|---|---|
| 2008/0053101 A1* | 3/2008 | Schwarz | B64D 33/02 |
| | | | 60/772 |
| 2015/0330310 A1* | 11/2015 | deGaribody | G01S 17/58 |
| | | | 702/45 |
| 2019/0032557 A1* | 1/2019 | Roach | F02C 7/042 |
| 2020/0070962 A1* | 3/2020 | Sidelkovskiy | F02C 7/057 |
| 2024/0092495 A1 | 3/2024 | Ghandour et al. | |
| 2025/0003835 A1* | 1/2025 | Sidelkovskiy | F02C 7/04 |

\* cited by examiner

INLETS FOR GAS TURBINE ENGINE FANS WITH DISTORTION TOLERANCE

STATEMENT REGARDING FEDERALLY SPONSORED RESEARCH OR DEVELOPMENT

Embodiments of the present disclosure were made with government support under Contract No. FA8650-19-F-2078. The government may have certain rights.

FIELD OF THE DISCLOSURE

The present disclosure relates generally to gas turbine engines, and more specifically to flow regulation in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

In embedded gas turbine engine applications, the engine may experience high distortion in the form of pressure gradients and swirl. The pressure and swirl distortions may cause engine stall or other undesirable aeromechanical behavior.

SUMMARY

The present disclosure may comprise one or more of the following features and combinations thereof.

An aircraft may comprise a duct system, a gas turbine engine, a flow regulation means, and a control unit. The duct system may be configured to receive a flow of air therethrough. The duct system may include a main duct, a first inlet duct in fluid communication with the main duct, and a second inlet duct in fluid communication with the main duct. The first inlet duct and the second inlet duct may each be arranged fluidly upstream of the main duct so as to conduct the flow of air from the first inlet duct and the second inlet duct into the main duct.

In some embodiments, the gas turbine engine may be in downstream fluid communication with the main duct. The gas turbine engine may include a fan, a compressor, a combustor, and a turbine. The fan may be configured to push air to provide thrust for the gas turbine engine. The compressor may be configured to rotate about an axis of the gas turbine engine to compress at least a portion of the air that flows from the fan. The combustor may be configured to receive the compressed air from the compressor. The turbine may be coupled to the compressor and configured to rotate about the axis of the gas turbine engine in response to receiving hot, high-pressure products of the combustor to drive the compressor.

In some embodiments, the flow regulation means may be for mechanically changing a shape of at least one of the first inlet duct and the second inlet duct to change an amount of the flow of air entering the first inlet duct and/or the second inlet duct in order to form a substantially uniform flow distribution through the main duct and into the fan so that stall in the gas turbine engine is managed. The control unit may be in communication with the flow regulation means. The control unit may be configured to selectively adjust the flow regulation means based, at least in part, on a received input related to the duct system or the fan of the gas turbine engine.

In some embodiments, the control unit may include a controller and a plurality of sensors arranged to measure pressure. The controller may be coupled to the plurality of sensors to receive pressure measurements from the plurality of sensors. The controller may be configured to adjust the flow regulation means based, at least in part, on the received pressure measurements.

In some embodiments, the plurality of sensors may include a first total pressure boundary layer rake arranged in the first inlet duct and a second total pressure boundary layer rake arranged in the second inlet duct. The plurality of sensors may include at least one first static pressure tap arranged in the first inlet duct and at least one second static pressure tap arranged in the second inlet duct. The plurality of sensors may comprise a plurality of pressure transducers arranged in the main duct axially forward of the fan.

In some embodiments, the control unit may include a controller and a memory in communication with the controller. The memory may include a plurality of preprogrammed aircraft maneuvers that each correspond to a predetermined adjustment of the flow regulation means. The controller may be configured to detect a preprogrammed aircraft maneuver included in the plurality of preprogrammed aircraft maneuvers on the memory and adjust the flow regulation means in response to detecting the preprogrammed aircraft maneuver.

In some embodiments, the control unit may be configured to receive an environmental input and the control unit may be configured to selectively adjust the flow regulation means based, at least in part, on the environmental input. The environmental input may include information regarding crosswinds.

In some embodiments, an axially forwardmost end of the first inlet duct may define a first inlet opening that receives the flow of air therethrough and an axially forwardmost end of the second inlet duct may define a second inlet opening that receives the flow of air therethrough. The flow regulation means may include an inlet flow expander coupled with the first inlet duct and moveable relative to the first inlet duct between a normal flow position in which the inlet flow expander is substantially aligned with a portion of the first inlet duct and the first inlet opening has a first inlet area and an increased flow position in which the inlet flow expander moves outwardly away from the portion of the first inlet duct and the first inlet opening has a second inlet area greater than the first inlet area so that the flow of air directed through the first inlet opening is increased while the inlet flow expander is in the increased flow position.

In some embodiments, an axially forwardmost end of the first inlet duct may define a first inlet opening that receives the flow of air therethrough and an axially forwardmost end of the second inlet duct may define a second inlet opening that receives the flow of air therethrough. The flow regulation means may include an inlet flow expander coupled with the first inlet duct and moveable relative to the first inlet duct between a normal flow position in which the first inlet opening has a first inlet area and an increased flow position in which the inlet flow expander moves axially aft relative to a portion of the first inlet duct and the first inlet opening has a second inlet area greater than the first inlet area so that the flow of air directed through the first inlet opening is increased while the inlet flow expander is in the increased flow position.

In some embodiments, an axially forwardmost end of the first inlet duct may define a first inlet opening that receives the flow of air therethrough and an axially forwardmost end of the second inlet duct may define a second inlet opening that receives the flow of air therethrough. The flow regulation means may include an inlet flow restrictor coupled with the first inlet duct aft of the first inlet opening and moveable between a reduced flow position in which the inlet flow restrictor protrudes into the first inlet duct and the first inlet duct has a first throat area and a normal flow position in which the inlet flow restrictor is substantially flush with a portion of the first inlet duct and the first inlet duct has a second throat area greater than the first throat area so that the flow of air directed through the first inlet opening is increased while the inlet flow restrictor is in the normal flow position.

According to another aspect of the present disclosure, an aircraft may comprise a duct system, a gas turbine engine, and an inlet flow regulation system. The duct system may include a main duct, a first inlet duct in fluid communication with the main duct, and a second inlet duct in fluid communication with the main duct. The first inlet duct and the second inlet duct may each be arranged fluidly upstream of the main duct. The gas turbine engine may be in downstream fluid communication with the main duct.

In some embodiments, the inlet flow regulation system may include an inlet flow regulator and a control unit. The inlet flow regulator may be configured to mechanically change a shape of at least one of the first inlet duct and the second inlet duct to change an amount of a flow of air entering the first inlet duct and/or the second inlet duct in order to form a substantially uniform flow distribution through the main duct and into the gas turbine engine. The control unit may be in communication with the inlet flow regulator and configured to selectively move the inlet flow regulator based, at least in part, on a received input related to the duct system or the gas turbine engine.

In some embodiments, the control unit may include a controller and a plurality of sensors arranged to measure pressure. The controller may be coupled to the plurality of sensors to receive pressure measurements from the plurality of sensors. The controller may be configured to move the inlet flow regulator based, at least in part, on the received pressure measurements.

In some embodiments, the plurality of sensors may include a first total pressure boundary layer rake arranged in the first inlet duct and a second total pressure boundary layer rake arranged in the second inlet duct. The plurality of sensors may include at least one first static pressure tap arranged in the first inlet duct and at least one second static pressure tap arranged in the second inlet duct. The plurality of sensors may comprise a plurality of pressure transducers arranged in the main duct axially forward of the gas turbine engine.

In some embodiments, the control unit may include a controller and a memory in communication with the controller. The memory may include a plurality of preprogrammed aircraft maneuvers that each correspond to a predetermined adjustment of the inlet flow regulator. The controller may be configured to detect a preprogrammed aircraft maneuver included in the plurality of preprogrammed aircraft maneuvers on the memory and adjust the inlet flow regulator in response to detecting the preprogrammed aircraft maneuver.

In some embodiments, the control unit may be configured to receive an environmental input and the control unit may be configured to selectively adjust the inlet flow regulator based, at least in part, on the environmental input. The environmental input may include information regarding crosswinds.

In some embodiments, an axially forwardmost end of the first inlet duct may define a first inlet opening that receives the flow of air therethrough and an axially forwardmost end of the second inlet duct may define a second inlet opening that receives the flow of air therethrough. The inlet flow regulator may be coupled with the first inlet duct and moveable relative to the first inlet duct between a normal flow position in which the inlet flow regulator is substantially aligned with a portion of the first inlet duct and the first inlet opening has a first inlet area and an increased flow position in which the inlet flow regulator moves outwardly away from the portion of the first inlet duct and the first inlet opening has a second inlet area greater than the first inlet area so that the flow of air directed through the first inlet opening is increased while the inlet flow regulator is in the increased flow position.

In some embodiments, an axially forwardmost end of the first inlet duct may define a first inlet opening that receives the flow of air therethrough and an axially forwardmost end of the second inlet duct may define a second inlet opening that receives the flow of air therethrough. The inlet flow regulator may be coupled with the first inlet duct and moveable relative to the first inlet duct between a normal flow position in which the first inlet opening has a first inlet area and an increased flow position in which the inlet flow regulator moves axially aft relative to the first inlet duct and the first inlet opening has a second inlet area greater than the first inlet area so that the flow of air directed through the first inlet opening is increased while the inlet flow regulator is in the increased flow position.

In some embodiments, an axially forwardmost end of the first inlet duct may define a first inlet opening that receives the flow of air therethrough and an axially forwardmost end of the second inlet duct may define a second inlet opening that receives the flow of air therethrough. The inlet flow regulator may be coupled with the first inlet duct aft of the first inlet opening and moveable between a reduced flow position in which the inlet flow regulator protrudes into the first inlet duct and the first inlet duct has a first throat area and a normal flow position in which the inlet flow regulator is substantially flush with a portion of the first inlet duct and the first inlet duct has a second throat area greater than the first throat area so that the flow of air directed through the first inlet opening is increased while the inlet flow regulator is in the normal flow position.

These and other features of the present disclosure will become more apparent from the following description of the illustrative embodiments.

DETAILED DESCRIPTION

Figure 1:
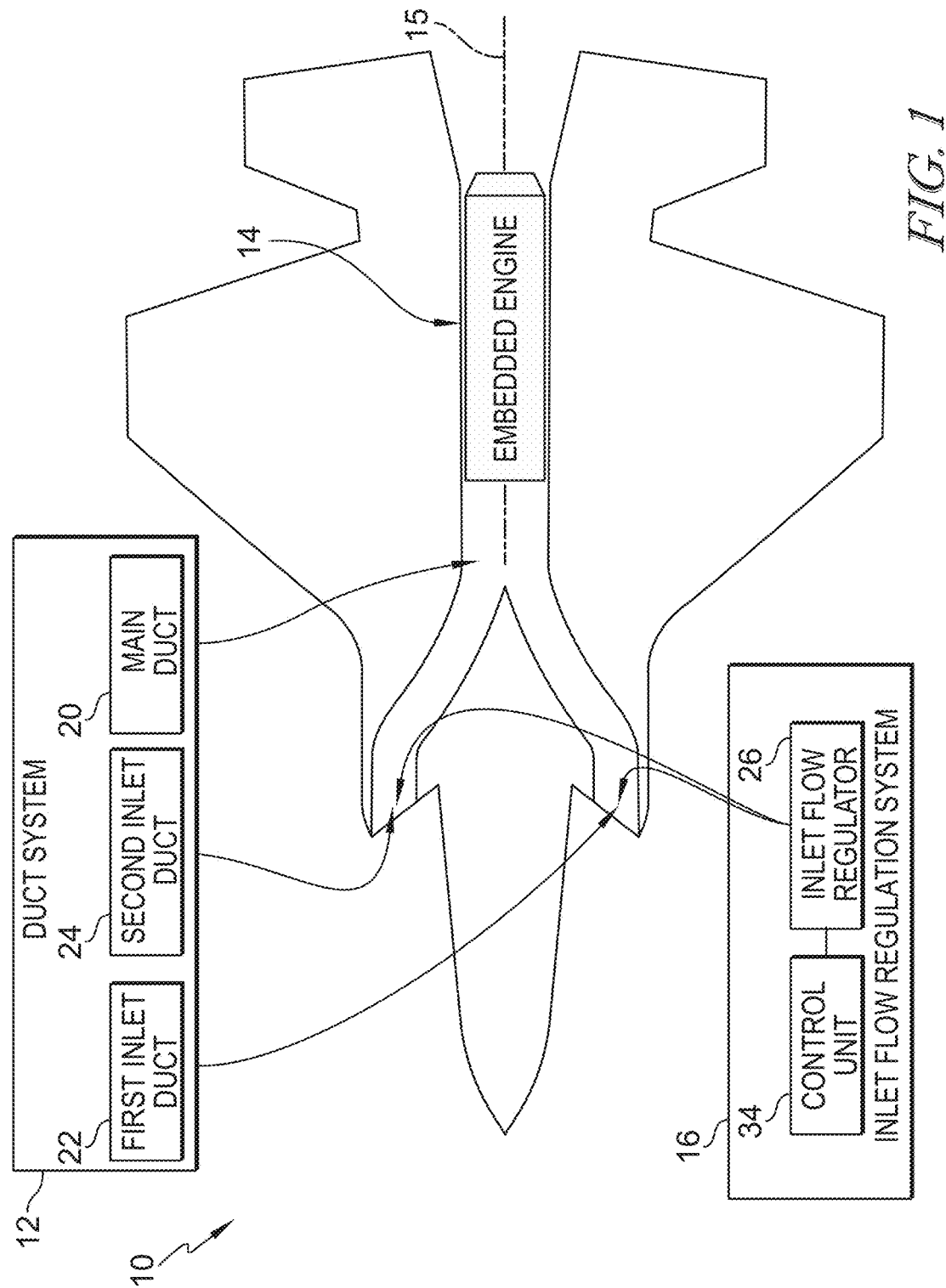
FIG. 1 is a diagrammatic view of an aircraft that includes a duct system having a main duct and inlet ducts arranged fluidly upstream of the main duct so as to conduct a flow of air from the inlet ducts into the main duct, a gas turbine engine in downstream fluid communication with the main duct, and an inlet flow regulation system that includes an inlet flow regulator and a control unit configured to selectively adjust the inlet flow regulator based, at least in part, on a received input related to the duct system or the gas turbine engine to manage stall, flutter, or forcing in the gas turbine engine.

For the purposes of promoting an understanding of the principles of the disclosure, reference will now be made to a number of illustrative embodiments illustrated in the drawings and specific language will be used to describe the same.

Figure 2:
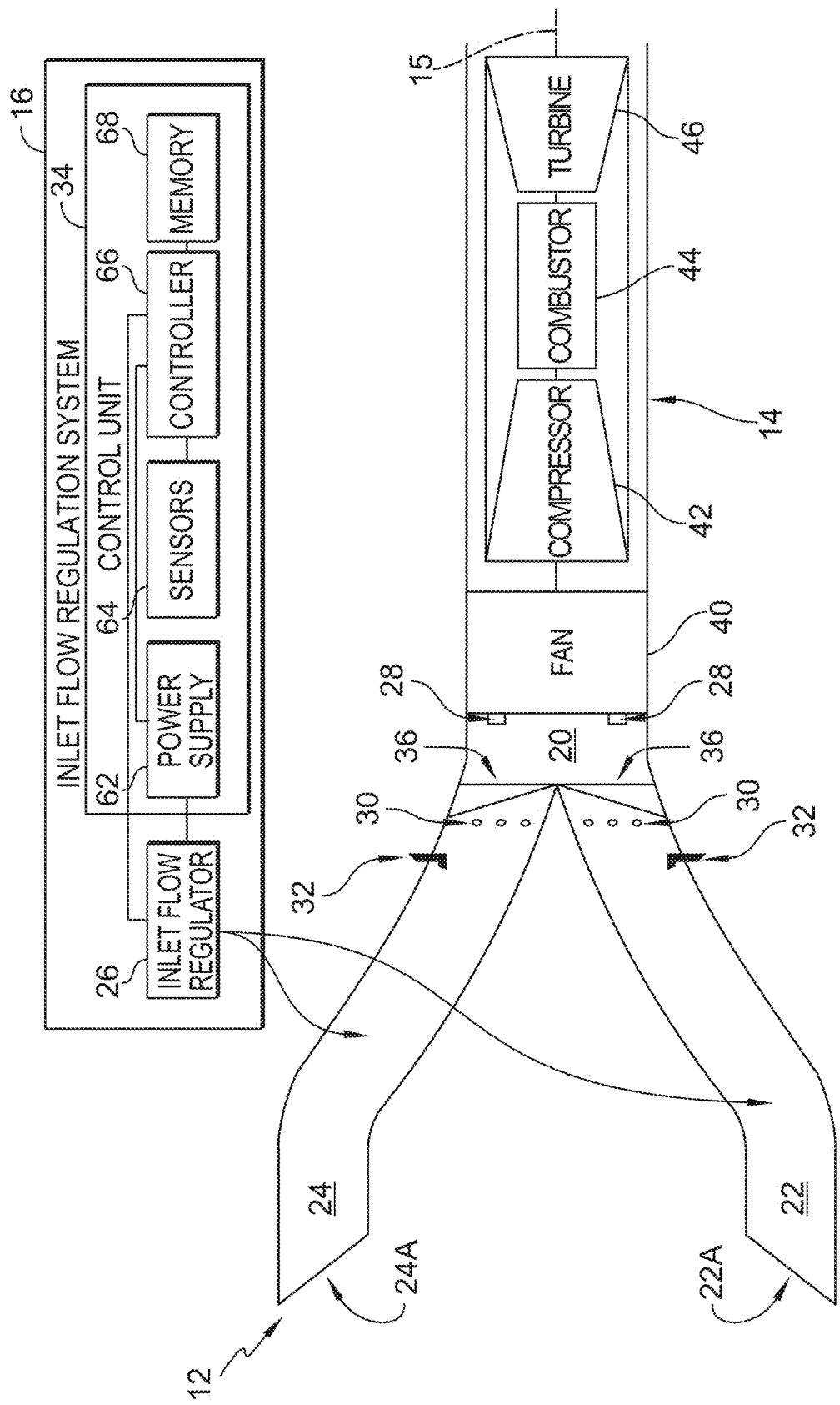
FIG. 2 is a detailed diagrammatic view of the aircraft of FIG. 1 showing the gas turbine engine includes a fan configured to push air to provide thrust for the gas turbine engine, a compressor configured to rotate about an axis of the gas turbine engine to compress at least a portion of the air that flows from the fan, a combustor configured to receive the compressed air from the compressor, and a turbine coupled to the compressor and configured to rotate about the axis of the gas turbine engine in response to receiving hot, high-pressure products of the combustor to drive the compressor.

An illustrative aircraft 10 includes a duct system 12, a gas turbine engine 14, and an inlet flow regulation system 16 as shown in FIGS. 1 and 2. The duct system 12 is configured to receive a flow of air therethrough. The duct system 12 includes a main duct 20, a first inlet duct 22, and a second inlet duct 24. The inlet ducts 22, 24 are arranged fluidly upstream of the main duct 20 so as to conduct the flow of air from the inlet ducts 22, 24 into the main duct 20. The gas turbine engine 14 is in downstream fluid communication with the main duct 20. The inlet flow regulation system 16 includes an inlet flow regulator 26 arranged in at least one of the inlet ducts 22, 24 and configured to mechanically change a shape of at least one of the inlet ducts 22, 24 to change an amount of the flow of air entering the inlet ducts 22, 24 to form a substantially uniform flow distribution through the main duct 20 and into a fan 40 of the gas turbine engine 14 so that stall in the gas turbine engine 14 is managed.

The inlet flow regulation system 16 includes the inlet flow regulator 26 and a control unit 34 as shown in FIGS. 1 and 2. The control unit 34 is in communication with the inlet flow regulator 26 and is configured to selectively adjust the inlet flow regulator 26 based, at least in part, on a received input related to the duct system 12 or the fan 40 of the gas turbine engine 14. At least a portion of the flow path of the gas turbine engine 14 is defined by the duct system 12. Locating the inlet flow regulator 26 in at least one of the inlet ducts 22, 24 allows for differential flows and pressures to be mitigated between the inlet ducts 22, 24 to help bring a more uniform distribution to the face of the fan 40.

In the illustrative embodiment, two inlet ducts 22, 24 are provided. In other embodiments, any number of inlet ducts may be provided that feed into the main duct 20. In some embodiments, the duct system 12 may include three inlet ducts. In other embodiments, the duct system 12 may include four inlet ducts. No matter the number of inlet ducts 22, 24, the inlet ducts are each arranged fluidly upstream of the main duct 20 so as to conduct the flow of air from the inlet ducts into the main duct 20. Additional ducts may be open, closed, or partially opened throughout operation of the aircraft 10.

Embedded engines on an aircraft may include multiple inlets, which transport air flow to a turbofan engine. In such configurations, when the aircraft experiences side slip, one portion of the fan of the engine experiences high flow while the other portion of the fan experiences low flow along with associated differential pressures as suggested in FIGS. 3 and 4. This may cause stall or aeromechanical issues in the engine if not mitigated or it may force the engine to impose keep-out zones or restrictions in its operating limitations.

Therefore, the aircraft 10 of the present disclosure includes the inlet flow regulation system 16 having the inlet flow regulator 26 in at least one of the inlet ducts 22, 24 to allow for differential flows and pressures to be mitigated. Mitigating the differential flows and pressures allows the fan 40 to adapt to or endure distortion patterns better than embodiments without the inlet flow regulation system 16.

Turning back to the gas turbine engine 14, the gas turbine engine 14 includes the fan 40, a compressor 42, a combustor 44, and a turbine 46 as shown in FIG. 2. The compressor 42 compresses and delivers air to the combustor 44. The combustor 44 mixes fuel with the compressed air received from the compressor 42 and ignites the fuel. The hot, high-pressure products of the combustion reaction in the combustor 44 are directed into the turbine 46 to cause the turbine 46 to rotate about an axis 15 of the gas turbine engine 14 and drive the compressor 42 and the fan 40. The fan 40 is driven by the turbine 46 and provides thrust for propelling the aircraft 10.

Figure 4:
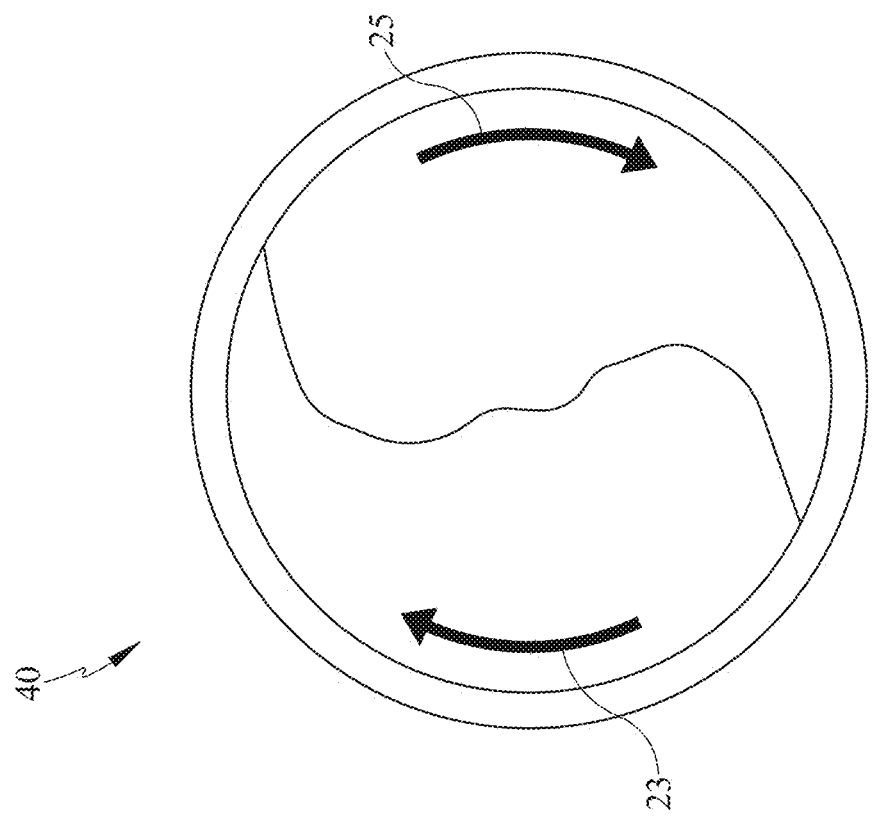
FIG. 4 is view similar to FIG. 3 suggesting diagrammatically that the different inlet flows from each inlet duct are funneled into sectors of the fan so as to distribute the inlet flows around a circumference of the fan.
Figure 3:
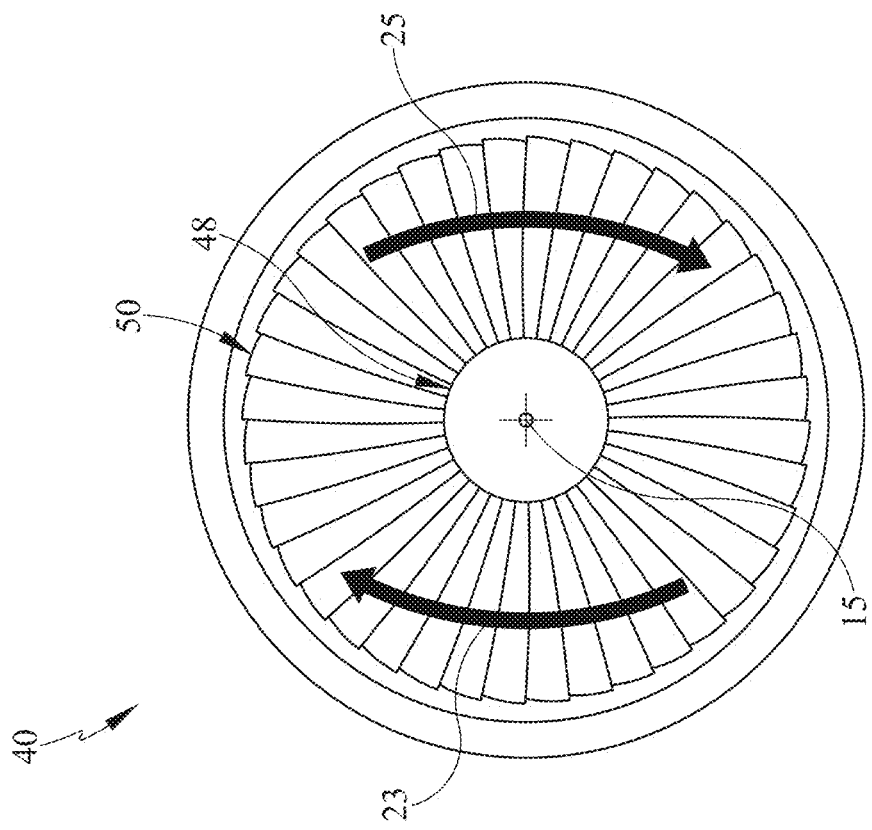
FIG. 3 is a diagrammatic view of the fan included in the aircraft of FIG. 2 showing different inlet flows from each inlet duct of the duct system at a fan face.
Figure 5:
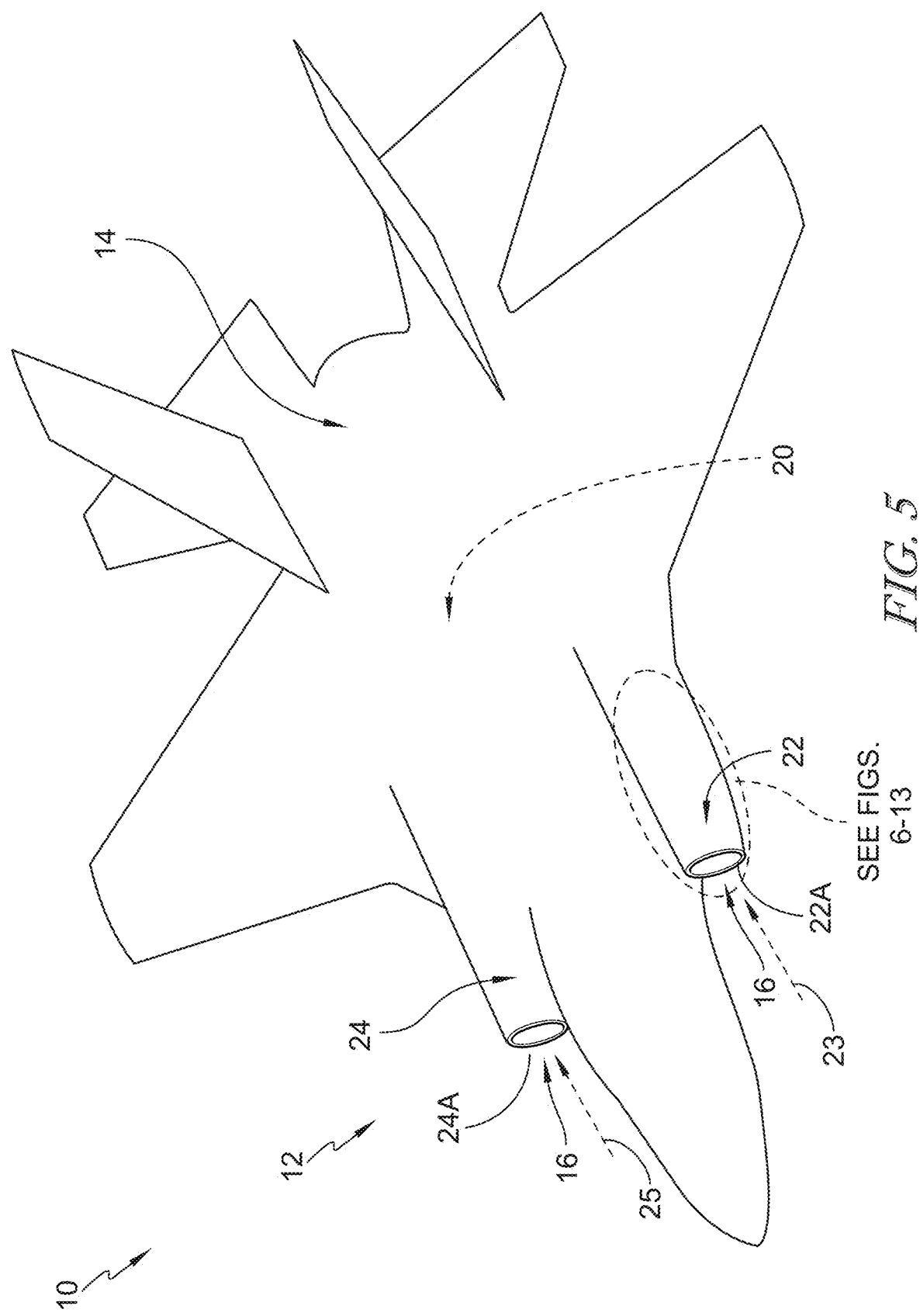
FIG. 5 is a perspective view of the aircraft of FIG. 1 showing a first inlet duct of the duct system on a first side of the aircraft and a second inlet duct of the duct system on a second side of the aircraft opposite the first side.

The fan 40 includes a fan rotor 48 and a plurality of fan blades 50 as shown in FIG. 3. The plurality of fan blades 50 each extend radially outward from the fan rotor 48. A flow of air 23, 25 from each inlet duct 22, 24 is funneled into different sectors of the fan 40 so as to distribute the inlet flows 23, 25 around the circumference of the fan 40 as shown in FIGS. 3 and 4. In some embodiments, the flow of air 23, 25 from each inlet duct 22, 24 may be divided and distributed to different sectors of the fan 40. In some embodiments, for example (not shown), the flow of air 23 from the first inlet duct 22 may be divided into two flows of air 23 that are directed to non-adjacent sectors of the fan 40 and the flow of air 25 from the second inlet duct 24 may be divided into two flows of air 25 that are directed to non-adjacent sectors of the fan 40. In such an embodiment, the flows of air 23, 25 are distributed around the circumference of the fan 40 such that each sector is spread out across multiple blades tangentially as the span increases. In other words, each sector does not form a perfect pie shape on the fan face.

In some embodiments, the gas turbine engine 14 is a turbofan. In some embodiments, the gas turbine engine is a turbojet.

The control unit 34 of the inlet flow regulation system 16 includes a power supply 62, a plurality of sensors 64, a controller 66 including a processor, and a memory 68 as shown in FIG. 2. The control unit 34 may comprise multiple processors and/or multiple memories 68. The power supply 62 is coupled to the inlet flow regulator 26 to provide power to the inlet flow regulator 26. In some embodiments, the power supply 62 to mechanically move the inlet flow regulator 26 may be hydraulic. The plurality of sensors 64 are arranged to measure a variable within the flow path of the gas turbine engine 14 upstream of the fan 40 (i.e., in the duct system 12). The controller 66 is coupled to the inlet flow regulator 26 and the power supply 62. The controller 66 is also coupled to the plurality of sensors 64 to receive inputs from the plurality of sensors 64 related to the measured variables. Based at least in part on the received inputs from the plurality of sensors 64, the controller 66 adjusts the inlet flow regulator 26. The memory 68 is coupled to the controller 66 and has a plurality of preprogrammed aircraft maneuvers stored therein.

In some embodiments, at least one sensor 28 of the plurality of sensors 64 is configured to measure a pressure in the main duct 20 axially forward of the fan 40 as shown in FIG. 2. In some embodiments, the at least one sensor 28 is a pressure transducer 28. Measurements from the pressure transducer 28 indicate stall of the fan 40 and/or a quality of the flow of air 23, 25 from the inlet ducts 22, 24. There may be a plurality of pressure transducers 28 within the main duct 20 as shown in FIG. 2. For example, at least one pressure transducer 28 may be located in the main duct 20 aligned with the first inlet duct 22 and at least one pressure transducer 28 may be located in the main duct 20 aligned with the second inlet duct 24.

In some embodiments, at least one sensor 30 of the plurality of sensors 64 is configured to measure a static pressure in the inlet ducts 22, 24 as shown in FIG. 2. In some embodiments, the at least one sensor 30 is a static pressure tap 30. Measurements from the static pressure tap 30 indicate stall of the fan 40 and/or a quality of the flow of air 23, 25 from the inlet ducts 22, 24. Measurements form the static pressure tap 30 may relate to static pressure within the duct system 12 and/or on surfaces of the inlet ducts 22, 24. There may be a plurality of static pressure taps 30 within the inlet ducts 22, 24 as shown in FIG. 2. For example, at least one static pressure tap 30 may be located in the first inlet duct 22 and at least one static pressure tap 30 may be located in the second inlet duct 24. As another example, a plurality of static pressure taps 30 may be located in the first inlet duct 22 and a plurality of static pressure taps 30 may be located in the second inlet duct 24.

In some embodiments, at least one sensor 32 of the plurality of sensors 64 is configured to measure a pressure in the inlet ducts 22, 24 as shown in FIG. 2. In some embodiments, the at least one sensor 32 is a total pressure boundary layer rake 32. Measurements from the total pressure boundary layer rake 32 indicate stall of the fan 40 and/or a quality of the flow of air 23, 25 from the inlet ducts 22, 24. Measurements from the total pressure boundary layer rake 32 may relate to pressure variation and/or distribution within the duct system 12 and/or on surfaces of the inlet ducts 22, 24. There may be a plurality of total pressure boundary layer rakes 32 within the inlet ducts 22, 24 as shown in FIG. 2. For example, at least one total pressure boundary layer rake 32 may be located in the first inlet duct 22 and at least one total pressure boundary layer rake 32 may be located in the second inlet duct 24.

In some embodiments, the plurality of sensors 64 comprises a Filtered Rayleigh Scattering (FRS) assembly 36 having a laser, a detector, and/or a filter. The FRS assembly 36 is configured to project light that interacts with the flow of air 23, 25 in the inlet ducts 22, 24. Rayleigh scattering occurs when the light interacts with particles in the flow of air 23, 25. While the particles are moving due to the flow velocity of the flow of air 23, 25, the scattered light experiences a frequency shift, which is related to the velocity of the particles. The total intensity of the scattered light is measured, which is indicative of the pressure of the flow of air 23, 25. FRS does not require seeding of the flow of air 23, 25 through the inlet ducts 22, 24. Measurements from the FRS assembly 36 indicate stall of the fan 40 and/or a quality of the flow of air 23, 25 from the inlet ducts 22, 24 without flow disruption. There may be a plurality of FRS assemblies 36 within the inlet ducts 22, 24 as shown in FIG. 2. For example, at least one FRS assembly 36 may be located in the first inlet duct 22 and at least one FRS assembly 36 may be located in the second inlet duct 24.

In some embodiments, the plurality of sensors 64 may comprise only one type of sensor (i.e., only one type of the pressure transducer 28, the static pressure tap 30, the total pressure boundary layer rake 32, or the FRS assembly 36). In some embodiments, the plurality of sensors 64 may comprise all types of sensors (i.e., each of the pressure transducer 28, the static pressure tap 30, the total pressure boundary layer rake 32, and the FRS assembly 36). In some embodiments, the plurality of sensors 64 may comprise any combination of multiple types of sensors (i.e., any combination of the pressure transducer 28, the static pressure tap 30, the total pressure boundary layer rake 32, and/or the FRS assembly 36).

The plurality of sensors 64 are in communication with the controller 66 so that the controller 66 receives inputs from the plurality of sensors 64 as suggested in FIG. 2. The received inputs include the pressure in the main duct 20, the static pressure in the inlet ducts 22, 24, and/or the pressure in the inlet ducts 22, 24, among other inputs. Based at least in part on the received inputs, the controller 66 adjusts the inlet flow regulator 26.

In some embodiments, the plurality of sensors 64 include other types of sensors in addition to those previously discussed. In some embodiments, the received inputs include a speed of the aircraft 10, an acceleration of the aircraft 10, an angle of side slip, an orientation of the aircraft 10, an altitude of the aircraft 10, flight conditions, a speed of the fan 40, or combinations of the same.

In some embodiments, the controller 66 receives environmental input(s) from additional sensors and/or aircraft control. For example, environmental input(s) include information regarding crosswinds, weather, altitude, temperature, among other information. In some embodiments, the environmental input(s) are related to information external to the aircraft 10.

In some embodiments, the received inputs are indicative of preprogrammed aircraft maneuvers stored in the memory 68. The controller 66 is configured to detect a preprogrammed aircraft maneuver included in the plurality of preprogrammed aircraft maneuvers stored on the memory 68 based, at least in part, on the received inputs. The controller 66 is configured to selectively adjust the inlet flow regulator 26 based, at least in part, on detecting the preprogrammed aircraft maneuver.

For instance, some maneuvers, i.e. banks, turns, rolls, etc., may cause more air to be pulled into one inlet duct 22, 24 compared to the other inlet duct 22, 24. Based on the maneuver, the pressure gradient at the fan face of the gas turbine engine 14 may be predicted such that the inlet flow regulator 26 can be adjusted preemptively to minimize any distortions. Based on the detected maneuver, the controller 66 is configured to adjust the inlet flow regulator 26 to help maintain optimum flow through the inlet ducts 22, 24 during the maneuvers. For example, the controller 66 adjusts the inlet flow regulator 26 to counter the predicted pressure distortions that will result from the aircraft maneuver to help bring a more uniform distribution to the face of the fan 40.

In some embodiments, other sensors on the aircraft 10 may detect different orientations of the aircraft 10 that correspond to one of the preprogrammed aircraft maneuvers and provide the information to the controller 66. The controller 66 is configured to adjust the inlet flow regulator 26 in response to the other sensor detecting the preprogrammed aircraft maneuver. In the illustrative embodiment, the controller 66 may be configured to use a combination of the received inputs and the detected preprogrammed aircraft maneuver to control the inlet flow regulator 26.

Turning back to the inlet flow regulation system 16, the inlet flow regulation system 16 includes the inlet flow regulator 26 and the control unit 34 as shown in FIGS. 1 and 2. The control unit 34 is configured to adjust the inlet flow regulator 26 in response to, for example, a pressure differential in the flow path of the gas turbine engine 14. Locating the inlet flow regulator 26 in at least one of the inlet ducts 22, 24 allows for differential flows and pressures to be mitigated between the different inlet ducts 22, 24 to help bring a more uniform distribution to the face of the fan 40.

Figure 6:
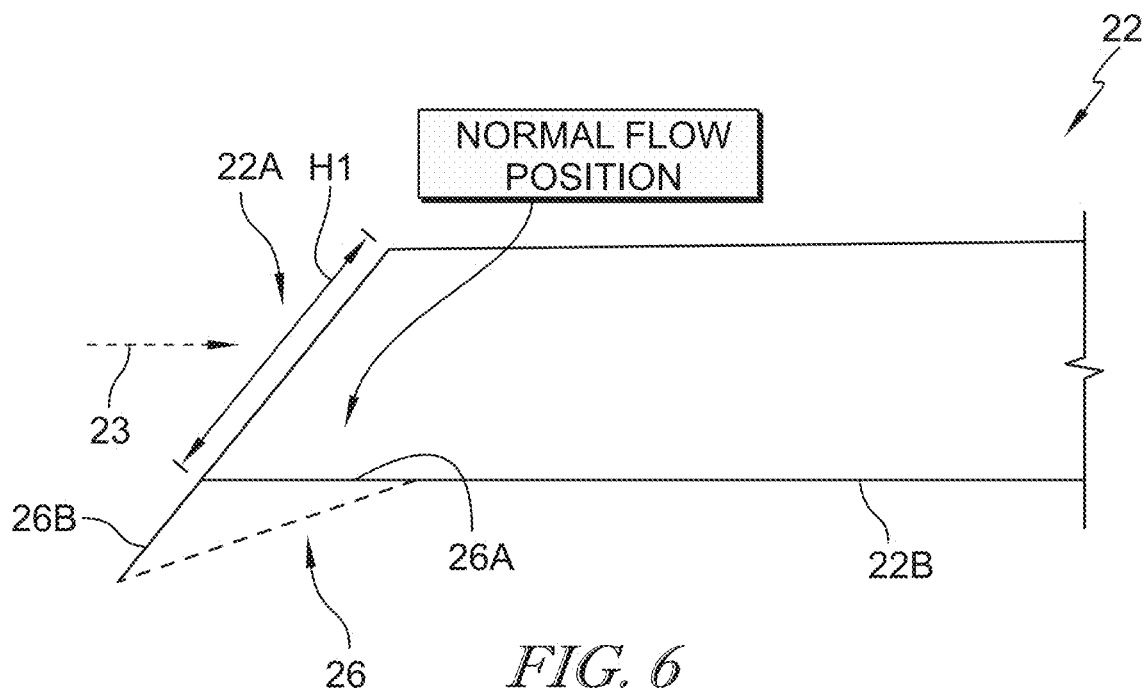
FIG. 6 is a diagrammatic view of the first inlet duct with the inlet flow regulator of FIG. 1 coupled thereto, the inlet flow regulator moveable relative to the first inlet duct between a normal flow position, as shown in FIG. 6, in which the first inlet duct has a first inlet area, and an increased flow position, as shown in FIG. 7.
Figure 7:
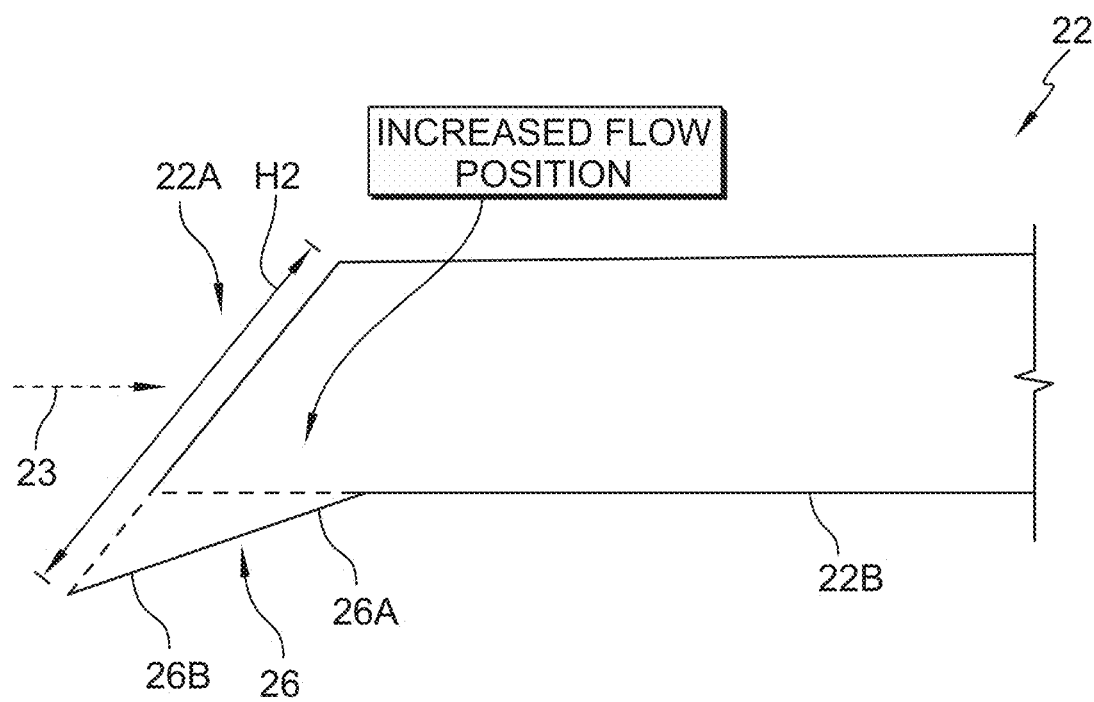
FIG. 7 is a diagrammatic view of the first inlet duct of FIG. 6 showing the inlet flow regulator in the increased flow position in which the first inlet duct has a second inlet area greater than the first inlet area, as shown in FIG. 6, so that the flow of air directed through the first inlet duct is increased.
Figure 8:
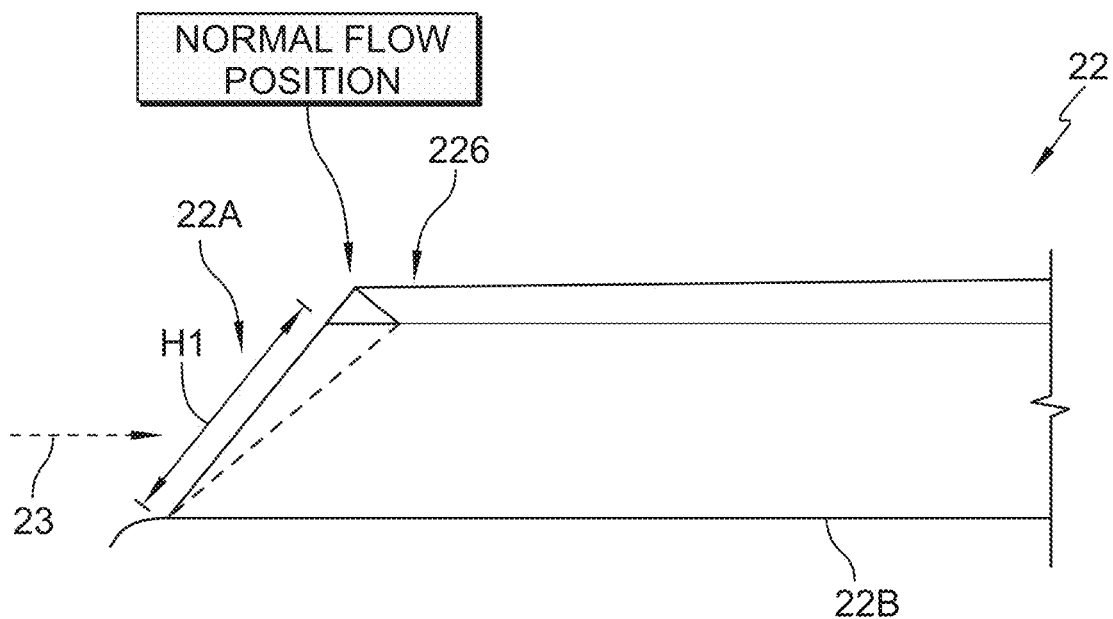
FIG. 8 is a diagrammatic view of the first inlet duct with a different inlet flow regulator coupled thereto, the inlet flow regulator moveable relative to the first inlet duct between a normal flow position, as shown in FIG. 8, in which the first inlet duct has a first inlet area, and an increased flow position, as shown in FIG. 9.
Figure 9:
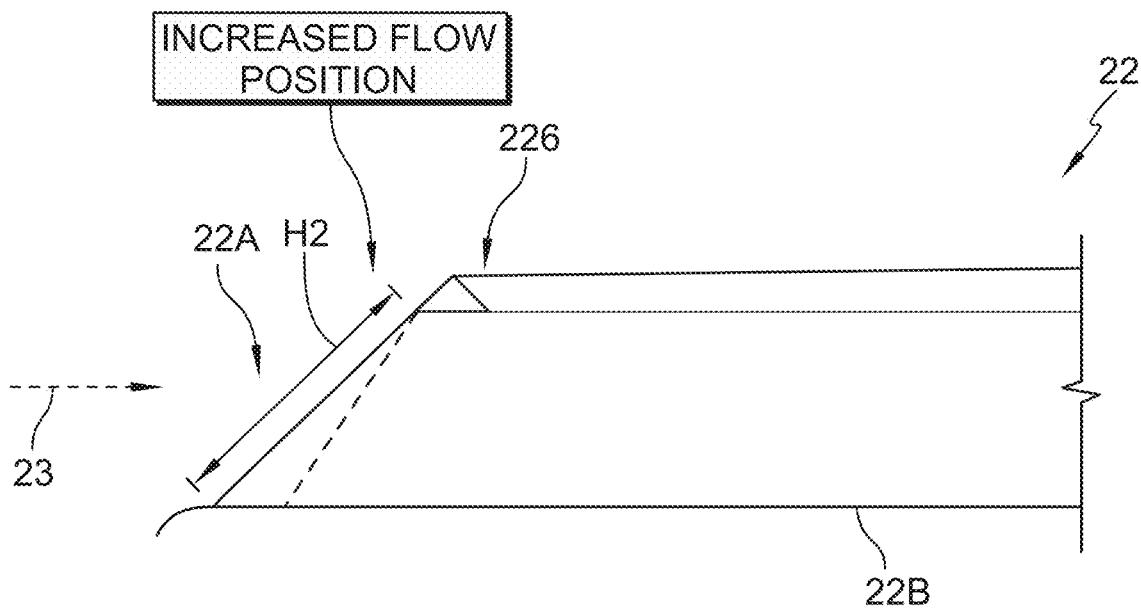
FIG. 9 is a diagrammatic view of the first inlet duct of FIG. 8 showing the inlet flow regulator in the increased flow position in which the first inlet duct has a second inlet area greater than the first inlet area, as shown in FIG. 8, so that the flow of air directed through the first inlet duct is increased.
Figure 10:
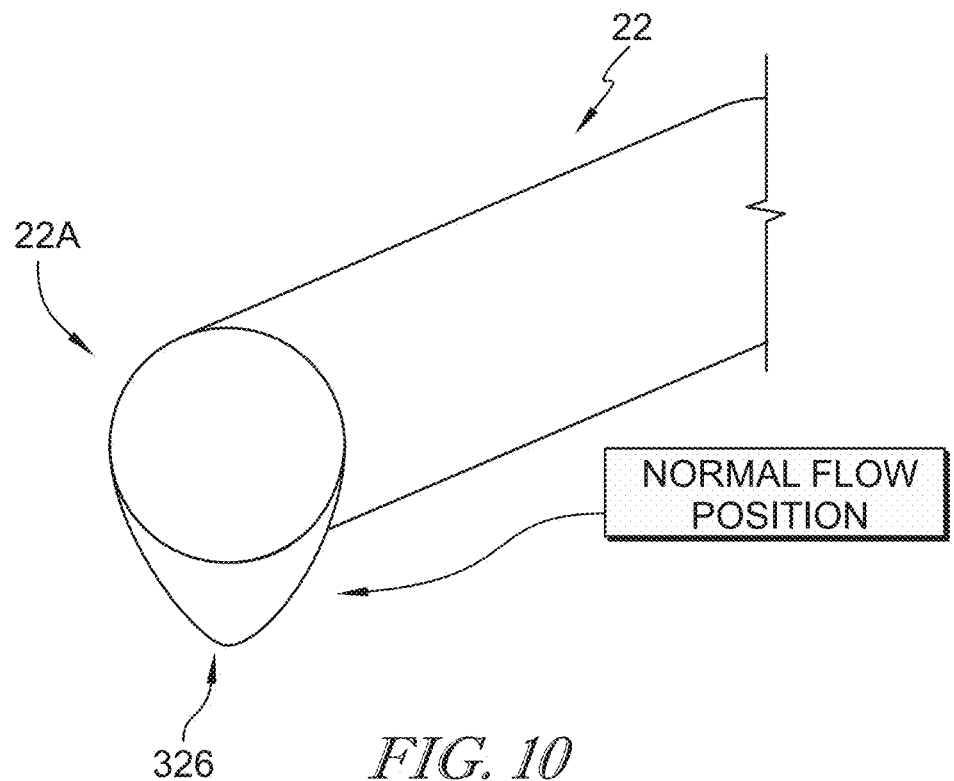
FIG. 10 is a diagrammatic view of the first inlet duct with a different inlet flow regulator coupled thereto, the inlet flow regulator moveable relative to the first inlet duct between a normal flow position, as shown in FIG. 10, and an increased flow position, as shown in FIG. 11.
Figure 11:
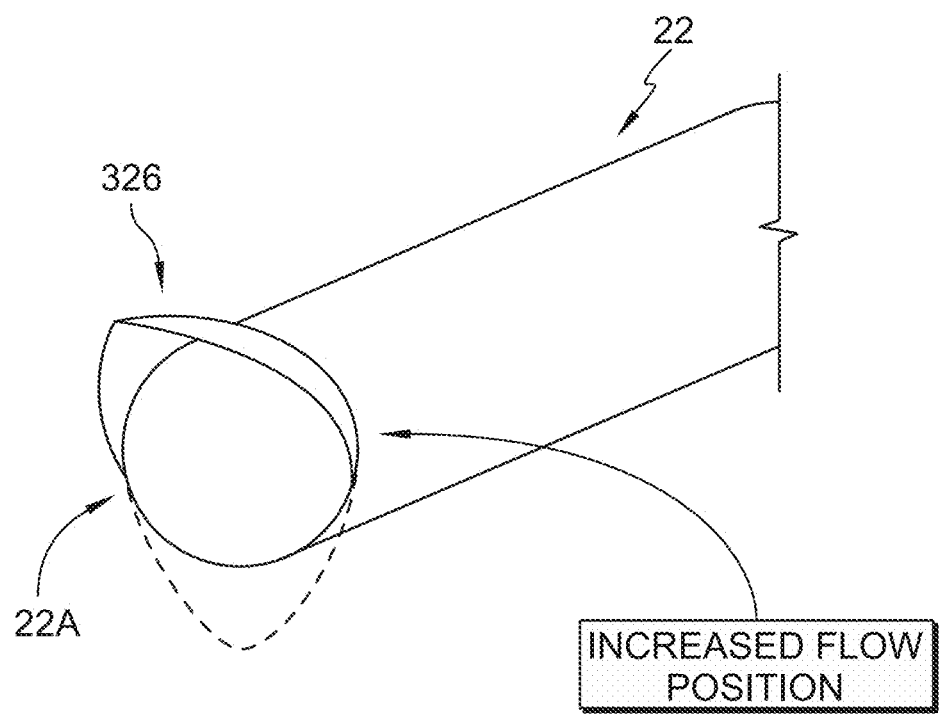
FIG. 11 is a diagrammatic view of the first inlet duct of FIG. 10 showing the inlet flow regulator in the increased flow position in which the inlet flow regulator rotates relative to the first inlet duct to scoop air into the first inlet duct so that the flow of air directed through the first inlet duct is increased.
Figure 12:
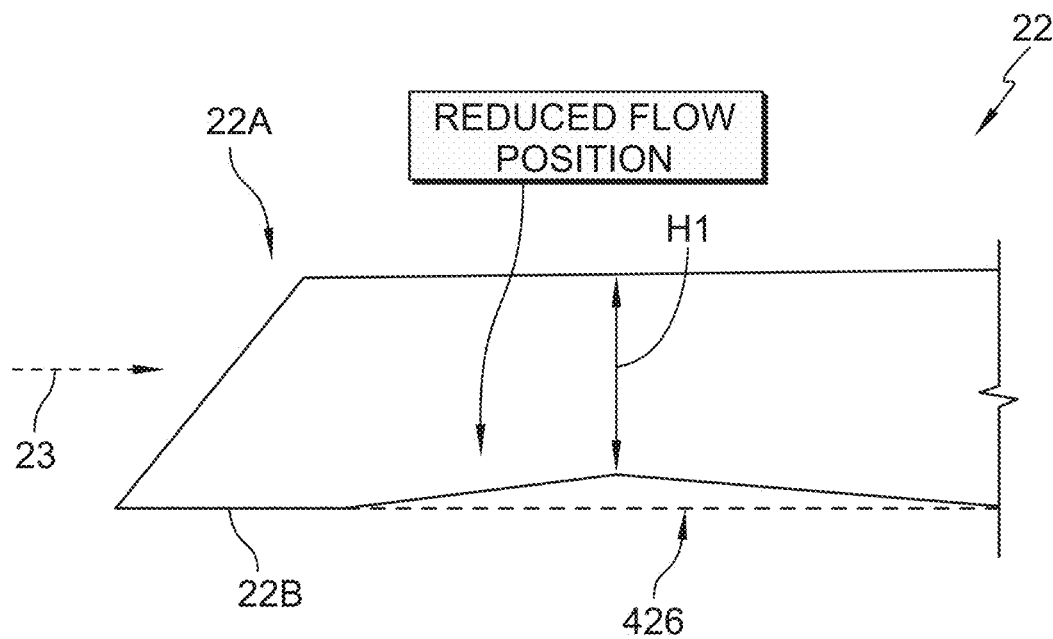
FIG. 12 is a diagrammatic view of the first inlet duct with a different inlet flow regulator coupled thereto, the inlet flow regulator moveable relative to the first inlet duct between a reduced flow position, as shown in FIG. 12, in which the first inlet duct has a first throat area, and a normal flow position, as shown in FIG. 13.
Figure 13:
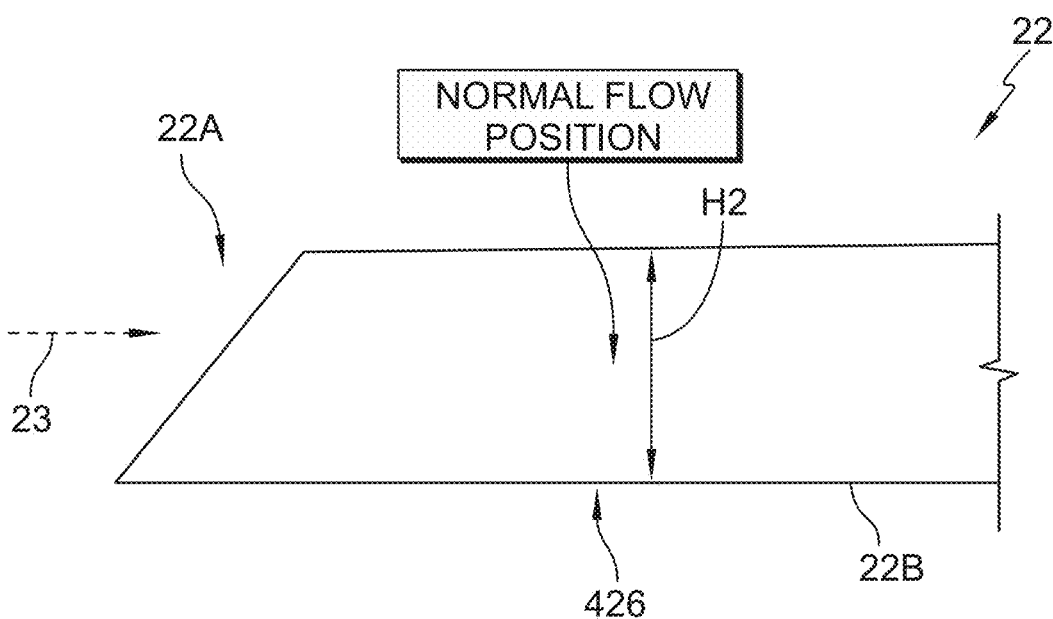
FIG. 13 is a diagrammatic view of the first inlet duct of FIG. 12 showing the inlet flow regulator in the normal flow position in which the first inlet duct has a second throat area greater than the first throat area, as shown in FIG. 12, so that the flow of air directed through the first inlet duct is increased.
Figure 14:
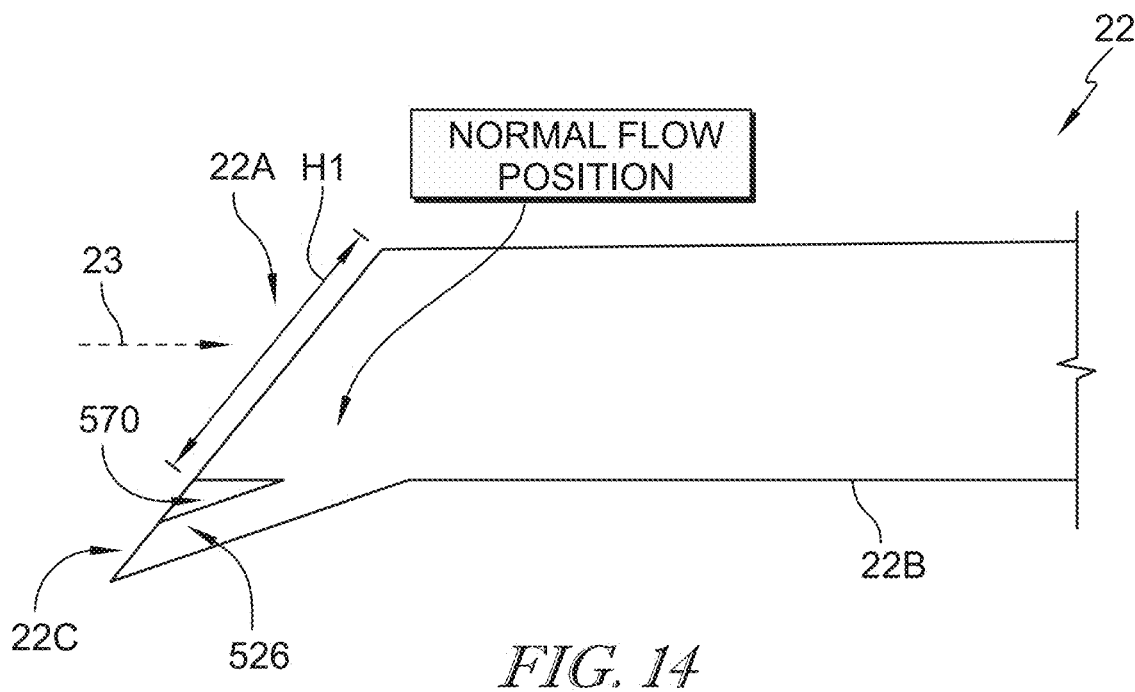
FIG. 14 is a diagrammatic view of the first inlet duct with a different inlet flow regulator coupled thereto, the inlet flow regulator moveable relative to the first inlet duct between a normal flow position, as shown in FIG. 14, and an increased flow position, as shown in FIG. 15.
Figure 15:
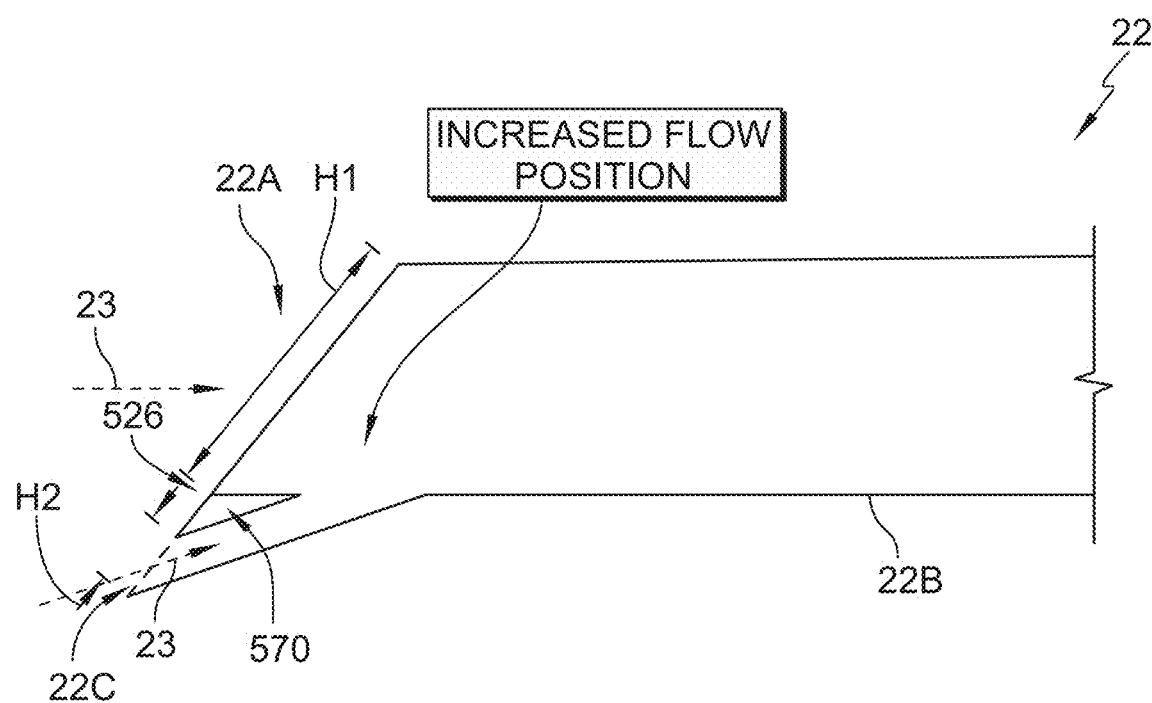
FIG. 15 is a diagrammatic view of the first inlet duct of FIG. 14 showing the inlet flow regulator in the increased flow position in which the inlet flow regulator slides to open an auxiliary opening so that the flow of air directed through the first inlet duct is increased.

The inlet flow regulation system 16 may include any number or combination of inlet flow regulators, such as the inlet flow regulator 26 shown in FIGS. 6 and 7, the inlet flow regulator 226 shown in FIGS. 8 and 9, the inlet flow regulator 326 shown in FIGS. 10 and 11, the inlet flow regulator 426 shown in FIGS. 12 and 13, and/or the inlet flow regulator 526 shown in FIGS. 14 and 15. One of the inlet ducts 22, 24 may include any combination of the inlet flow regulators 26, 226, 326, 426, 526 and the inlet ducts 22, 24 may include different inlet flow regulators 26, 226, 326, 426, 526.

In some embodiments, the inlet flow regulator 26 is arranged at a first inlet opening 22A of the first inlet duct 22 as shown in FIGS. 6 and 7. In some embodiments, the inlet flow regulator 26 is arranged at a second inlet opening 24A of the second inlet duct 24. In some embodiments, one inlet flow regulator 26 is arranged at each of the first inlet opening 22A and the second inlet opening 24A (i.e., the inlet flow regulation system 16 includes two inlet flow regulators 26). The inlet flow regulator 26 may also be referred to as an inlet flow expander. The inlet flow regulator 26 is coupled with a bottom wall 22B of the first inlet duct 22 adjacent the first inlet opening 22A. The inlet flow regulator 26 is moveable relative to the bottom wall 22B of the first inlet duct 22 between a normal flow position, as shown in FIG. 6, and an increased flow position, as shown in FIG. 7.

In the normal flow position as shown in FIG. 6, a first portion 26A of the inlet flow regulator 26 is substantially aligned with and extends axially forward from the bottom wall 22B of the first inlet duct 22 so that the inlet flow regulator 26 does not substantially impact the flow of air 23 into and through the first inlet duct 22. A second portion 26B of the inlet flow regulator 26 is coupled to an axially forward end of the first portion 26A of the inlet flow regulator 26, as shown in FIG. 6. The second portion 26B extends axially forward and outwardly away from the first portion 26A to form an obtuse angle with the first portion 26A. The first portion 26A and the second portion 26B are coupled together via a hinge at the axially forward end of the first portion 26A. While in the normal flow position, the first inlet opening 22A has a first inlet area and a first inlet height H1 as shown in FIG. 6.

In the increased flow position as shown in FIG. 7, the first portion 26A of the inlet flow regulator 26 moves downwardly relative to the bottom wall 22B of the first inlet duct 22 so that the first portion 26A of the inlet flow regulator 26 is not substantially aligned with the bottom wall 22B of the first inlet duct 22. Due to the hinge, in the increased flow position, the first portion 26A and the second portion 26B move downwardly to form a substantially straight line with one another, as shown in FIG. 7. While in the increased flow position, the first inlet opening 22A has a second inlet area and a second inlet height H2, as shown in FIG. 7, that is greater than the first inlet area and the first inlet height H1. Due to the greater second inlet area (and greater second inlet height H2), the flow of air 23 directed through the first inlet duct 22 is increased while the inlet flow regulator 26 is in the increased flow position. The inlet flow regulator 26 opens up as an auxiliary opening to increase the inlet area of the first inlet opening 22A. The inlet flow regulator 26 is illustratively formed as an auxiliary opening or an auxiliary door. In some embodiments, the inlet flow regulator 26, specifically the first portion 26A, slides axially relative to the bottom wall 22B to reach the increased flow position from the normal flow position. In other embodiments, the inlet flow regulator 26 pivots relative to the bottom wall 22B between the normal flow position and the increased flow position and extends or slides axially forward from the bottom wall 22B. Illustratively, the inlet flow regulator 26 is moved to the increased flow position to increase the flow of air 23, 25 entering the inlet duct 22, 24 having a relatively low flow therethrough as compared to the other inlet duct 22, 24.

The control unit 34 includes the power supply 62, the sensors 64, the controller 66, and the memory 68 as shown in FIG. 2. The power supply 62 is coupled to the inlet flow regulator 26 to provide power to the inlet flow regulator 26 for movement between the normal flow position and the increased flow position.

The power supply 62 may include a generator and batteries (not shown). In some embodiments, the generator may be embedded in the gas turbine engine 14. The generator may be coupled to the gas turbine engine 14 to produce electricity during use of the gas turbine engine 14 in the illustrative embodiment. The generator may be coupled to the inlet flow regulator 26 to supply power to the inlet flow regulator 26 to drive movement of the inlet flow regulator 26. The batteries may be coupled to the generator to store electricity produced by the generator. The batteries may be coupled to the inlet flow regulator 26 to supply power to the inlet flow regulator 26.

In some embodiments, the batteries may supplement the power supplied by the generator to the inlet flow regulator 26. The batteries may supply power to the inlet flow regulator 26 during takeoff of the aircraft and/or during cruise conditions.

Another embodiment of an inlet flow regulator 226 in accordance with the present disclosure is shown in FIGS. 8 and 9. In some embodiments, the inlet flow regulator 226 is arranged at the first inlet opening 22A of the first inlet duct 22. In some embodiments, the inlet flow regulator 226 is arranged at the second inlet opening 24A of the second inlet duct 24. In some embodiments, one inlet flow regulator 226 is arranged at each of the first inlet opening 22A and the second inlet opening 24A. The inlet flow regulator 226 may also be referred to as an inlet flow expander. The inlet flow regulator 226 may be used in combination with or instead of the inlet flow regulator 26 shown in FIGS. 6 and 7. The inlet flow regulator 226 forms a portion of the first inlet opening 22A of the first inlet duct 22. The inlet flow regulator 226 is moveable relative to the bottom wall 22B of the first inlet duct 22 between a normal flow position, as shown in FIG. 8, and an increased flow position, as shown in FIG. 9.

While in the normal flow position as shown in FIG. 8, the first inlet opening 22A has a first inlet area and a first inlet height H1. In the increased flow position as shown in FIG. 9, the inlet flow regulator 226 moves aft relative to the bottom wall 22B of the first inlet duct 22. While in the increased flow position, the first inlet opening 22A has a second inlet area and a second inlet height H2, as shown in FIG. 9, that is greater than the first inlet area and the first inlet height H1. The axial aft movement of the inlet flow regulator 226 opens up an additional opening so that the area of the first inlet opening 22A increases. Due to the greater second inlet area H2, the flow of air 23 directed into and through the first inlet duct 22 is increased while the inlet flow regulator 226 is in the increased flow position. The inlet flow regulator 226 retracts and/or slides a portion of the first inlet opening 22A (i.e., the top and side walls of the first inlet duct 22) relative to the bottom wall 22B such that the first inlet opening 22A increases in size. In other words, the area of the first inlet opening 22A increases because a hypotenuse at the first inlet opening 22A increases in length as the inlet flow regulator 226 slides axially aft. The inlet flow regulator 226 is illustratively formed as a sliding lip. Illustratively, the inlet flow regulator 226 is moved to the increased flow position to increase the flow of air 23, 25 entering the inlet duct 22, 24 having a relatively low flow therethrough as compared to the other inlet duct 22, 24.

The power supply 62 is coupled to the inlet flow regulator 226 to provide power to the inlet flow regulator 226 for movement between the normal flow position and the increased flow position. The power supply 62 may include a generator and batteries (not shown). In some embodiments, the power supply 62 to mechanically move the inlet flow regulator 226 may be hydraulic. In some embodiments, the generator may be embedded in the gas turbine engine 14. The generator may be coupled to the gas turbine engine 14 to produce electricity during use of the gas turbine engine 14 in the illustrative embodiment. The generator may be coupled to the inlet flow regulator 226 to supply power to the inlet flow regulator 226 to drive movement of the inlet flow regulator 226. The batteries may be coupled to the generator to store electricity produced by the generator. The batteries may be coupled to the inlet flow regulator 226 to supply power to the inlet flow regulator 226.

In some embodiments, the batteries may supplement the power supplied by the generator to the inlet flow regulator 226. The batteries may supply power to the inlet flow regulator 226 during takeoff of the aircraft and/or during cruise conditions.

Another embodiment of an inlet flow regulator 326 in accordance with the present disclosure is shown in FIGS. 10 and 11. In some embodiments, the inlet flow regulator 326 is arranged at the first inlet opening 22A of the first inlet duct 22. In some embodiments, the inlet flow regulator 326 is arranged at the second inlet opening 24A of the second inlet duct 24. In some embodiments, one inlet flow regulator 326 is arranged at each of the first inlet opening 22A and the second inlet opening 24A. The inlet flow regulator 326 may also be referred to as an inlet flow expander. The inlet flow regulator 326 may be used in combination with or instead of the inlet flow regulators 26, 226.

The inlet flow regulator 326 is coupled with the first inlet duct 22 adjacent the first inlet opening 22A as shown in FIG. 10. The inlet flow regulator 326 is moveable relative to the first inlet opening 22A of the first inlet duct 22 between a normal flow position, as shown in FIG. 10, and an increased flow position, as shown in FIG. 11. In the normal flow position, the inlet flow regulator 326 does not protrude radially upward beyond the first inlet duct 22 such that the inlet flow regulator 326 does not substantially impact the flow of air 23 into the first inlet opening 22A. In the increased flow position as shown in FIG. 11, the inlet flow regulator 326 rotates upwardly relative to the first inlet opening 22A such that the inlet flow regulator protrudes radially upward beyond at least a portion of the first inlet duct 22. The inlet flow regulator 326 is illustratively formed as a scoop such that, while in the increased flow position, the flow of air 23 directed through the first inlet duct 22 is increased. Illustratively, the inlet flow regulator 326 is moved to the increased flow position to increase the flow of air 23, 25 entering the inlet duct 22, 24 having a relatively low flow therethrough as compared to the other inlet duct 22, 24.

The power supply 62 is coupled to the inlet flow regulator 326 to provide power to the inlet flow regulator 326 for rotation between the normal flow position and the increased flow position. The power supply 62 may include a generator and batteries (not shown). In some embodiments, the power supply 62 to mechanically move the inlet flow regulator 326 may be hydraulic. In some embodiments, the generator may be embedded in the gas turbine engine 14. The generator may be coupled to the gas turbine engine 14 to produce electricity during use of the gas turbine engine 14 in the illustrative embodiment. The generator may be coupled to the inlet flow regulator 326 to supply power to the inlet flow regulator 326 to drive movement of the inlet flow regulator 326. The batteries may be coupled to the generator to store electricity produced by the generator. The batteries may be coupled to the inlet flow regulator 326 to supply power to the inlet flow regulator 326.

In some embodiments, the batteries may supplement the power supplied by the generator to the inlet flow regulator 326. The batteries may supply power to the inlet flow regulator 326 during takeoff of the aircraft and/or during cruise conditions.

Another embodiment of an inlet flow regulator 426 in accordance with the present disclosure is shown in FIGS. 12 and 13. In some embodiments, the inlet flow regulator 426 is arranged in the first inlet duct 22 axially aft of the first inlet opening 22A. In some embodiments, the inlet flow regulator 426 is arranged in the second inlet duct 24 axially aft of the second inlet opening 24A. In some embodiments, one inlet flow regulator 426 is arranged in each of the inlet ducts 22, 24. The inlet flow regulator 426 may also be referred to as an inlet flow restrictor. The inlet flow regulator 426 may be used in combination with or instead of the inlet flow regulators 26, 226, 326.

The inlet flow regulator 426 is coupled with the bottom wall 22B of the first inlet duct 22 axially aft of the first inlet opening 22A as shown in FIGS. 12 and 13. The inlet flow regulator 426 is moveable relative to the bottom wall 22B of the first inlet duct 22 between a reduced flow position, as shown in FIG. 12, and a normal flow position, as shown in FIG. 13. While in the reduced flow position, the first inlet duct 22 has a first throat area and a first height H1 at the inlet flow regulator 426, as shown in FIG. 12. While in the normal flow position as shown in FIG. 13, the inlet flow regulator 426 is substantially flush with the bottom wall 22B of the first inlet duct 22 such that the inlet flow regulator 426 does not substantially impact the flow of air 23 through the first inlet duct 22. In the normal flow position, the first inlet duct 22 has a second throat area and a second height H2 at the inlet flow regulator 426. In the normal flow position as shown in FIG. 13, the inlet flow regulator 426 moves downwardly relative to the bottom wall 22B such that the inlet flow regulator 426 is substantially flush with the bottom wall 22B.

In the reduced flow position, the inlet flow regulator 426 moves upwardly relative to the bottom wall 22B to block a portion of the first inlet duct 22. The inlet flow regulator 426 protrudes into the first inlet duct 22 while in the reduced flow position. Due to the smaller first throat area and the smaller first height H1, the flow of air 23 directed through the first inlet duct 22 is decreased while the inlet flow regulator 426 is in the reduced flow position.

In some embodiments, the inlet flow regulator 426 forms a portion of the bottom wall 22B as suggested in FIGS. 12 and 13. In some embodiments, the inlet flow regulator 426 is coupled with a top surface of the bottom wall 22B.

The inlet flow regulator 426 is illustratively formed as a ramp. The ramp chokes the flow of air 23 to decrease the amount of air being directed through the first inlet duct 22. Illustratively, the inlet flow regulator 426 is moved to the normal flow position to increase the flow of air 23, 25 entering the inlet duct 22, 24 having a relatively low flow therethrough.

The power supply 62 is coupled to the inlet flow regulator 426 to provide power to the inlet flow regulator 426 for movement between the normal flow position and the reduced flow position. The power supply 62 may include a generator and batteries (not shown). In some embodiments, the power supply 62 to mechanically move the inlet flow regulator 426 may be hydraulic. In some embodiments, the generator may be embedded in the gas turbine engine 14. The generator may be coupled to the gas turbine engine 14 to produce electricity during use of the gas turbine engine 14 in the illustrative embodiment. The generator may be coupled to the inlet flow regulator 426 to supply power to the inlet flow regulator 426 to drive movement of the inlet flow regulator 426. The batteries may be coupled to the generator to store electricity produced by the generator. The batteries may be coupled to the inlet flow regulator 426 to supply power to the inlet flow regulator 426.

In some embodiments, the batteries may supplement the power supplied by the generator to the inlet flow regulator 426. The batteries may supply power to the inlet flow regulator 426 during takeoff of the aircraft and/or during cruise conditions.

Another embodiment of an inlet flow regulator 526 in accordance with the present disclosure is shown in FIGS. 14 and 15. In some embodiments, the inlet flow regulator 526 is arranged at the first inlet opening 22A of the first inlet duct 22. In some embodiments, the inlet flow regulator 526 is arranged at the second inlet opening 24A of the second inlet duct 24. In some embodiments, one inlet flow regulator 526 is arranged at each of the first inlet opening 22A and the second inlet opening 24A. The inlet flow regulator 526 may also be referred to as an inlet flow expander. The inlet flow regulator 526 may be used in combination with or instead of the inlet flow regulators 26, 226, 326, 426.

The inlet flow regulator 526 is coupled with the first inlet duct 22 adjacent the first inlet opening 22A, as shown in FIG. 14. The inlet flow regulator 526 is moveable relative to the first inlet opening 22A of the first inlet duct 22 between a normal flow position, as shown in FIG. 14, and an increased flow position, as shown in FIG. 15. Illustratively, the inlet flow regulator 526 is formed as a sliding door. In the normal flow position, the inlet flow regulator 526 is positioned such that an auxiliary opening 22C into the first inlet duct 22 is blocked and not open. The first inlet opening 22A has a first height H1 while the inlet flow regulator 526 is in the normal flow positon. In the increased flow position, as shown in FIG. 15, the inlet flow regulator 526 slides relative to the first inlet opening 22A such that the inlet flow regulator 526 opens up and does not block the auxiliary opening 22C. The auxiliary opening 22C has a second height H2. While in the increased flow position, the flow of air 23 directed through the first inlet duct 22 is increased as the flow of air 23 enters both the first inlet opening 22A having the first height H1 and the auxiliary opening 22C having the second height H2.

Illustratively, the inlet flow regulator 526 is moved to the increased flow position to increase the flow of air 23, 25 entering the inlet duct 22, 24 having a relatively low flow therethrough as compared to the other inlet duct 22, 24. In some embodiments, the auxiliary opening 22C may be positioned in a nacelle or an aircraft body below, above, or to sides of the first inlet duct 22.

In some embodiments, the inlet flow regulator 526 is coupled to a support 570, as shown in FIGS. 14 and 15. The inlet flow regulator 526 translates between the normal flow positon and the increased flow position relative to the support 570.

The power supply 62 is coupled to the inlet flow regulator 526 to provide power to the inlet flow regulator 526 for movement between the normal flow position and the increased flow position. The power supply 62 may include a generator and batteries (not shown). In some embodiments, the power supply 62 to mechanically move the inlet flow regulator 526 may be hydraulic. In some embodiments, the generator may be embedded in the gas turbine engine 14. The generator may be coupled to the gas turbine engine 14 to produce electricity during use of the gas turbine engine 14 in the illustrative embodiment. The generator may be coupled to the inlet flow regulator 526 to supply power to the inlet flow regulator 526 to drive movement of the inlet flow regulator 526. The batteries may be coupled to the generator to store electricity produced by the generator. The batteries may be coupled to the inlet flow regulator 526 to supply power to the inlet flow regulator 526.

In some embodiments, the batteries may supplement the power supplied by the generator to the inlet flow regulator 526. The batteries may supply power to the inlet flow regulator 526 during takeoff of the aircraft and/or during cruise conditions.

The present disclosure provides a plurality of inlet flow regulators (i.e., flow regulation means) 26, 226, 326, 426, 526. The inlet flow regulators 26, 226, 326, 426, 526 may be combined and used in a single inlet duct 22, 24. For example, the first inlet duct 22 may include the inlet flow regulator 26 to increase the flow of air 23 therethrough and the inlet flow regulator 426 to decrease the flow of air 23 therethrough at different times depending on the needs of the aircraft 10.

As another example, at one time, the inlet flow regulator 26, 226, 326, 526 in the first inlet duct 22 may move to the increased flow position to increase the flow of air 23 through the first inlet duct 22 while the inlet flow regulator 426 in the second inlet duct 24 may move to the reduced flow position to decrease the flow of air 25 through the second inlet duct 24 so that each inlet duct 22, 24 receives substantially the same flow of air 23, 25 therethrough. Further, the first inlet duct 22 and the second inlet duct 24 may include the same or different inlet flow regulators 26, 226, 326, 426, 526. Any number of inlet flow regulators 26, 226, 326, 426, 526 may be mechanically adjusted simultaneously or substantially simultaneously to achieve a specified outcome.

In some embodiments, the inlet flow regulation system 16 may include shape memory alloy. In such embodiments, the shape memory alloy is arranged near the inlet openings 22A, 24A so that, upon activation, the shape memory allow adjusts the shape of the inlet openings 22A, 24A to be smaller or larger depending on the needs of the aircraft 10.

Embedded applications may involve multiple inlets, which transport air flow to a turbofan. As technology progresses, the potential for an increased number of smaller inlets spread across an aircraft 10 and/or simpler bifurcated inlets may be possible. These duct systems may deliver inequivalent quality air flows with various distortions from different inlets, particularly during maneuvers such as significant side slip or angle of attack.

As a result, one portion of the fan 40 experiences high flow while the other portion of the fan 40 experiences low flow along with associated differential pressure. If not mitigated, this may cause stall or aeromechanical issues or may force the engine 14 to impose keep-out zones or restrictions. Therefore, a means to offset or overcome such distortions may be beneficial to the advancement of airframe and engine capabilities.

Utilizing variable area controls at inlet openings 22A, 24A or ramped surfaces within the inlet ducts 22, 24 may allow for differential flows and pressures to be mitigated between the different inlets ducts 22, 24 and bring more uniform distribution to the fan face. These could be an additional opening up at the mouth of an inlet, or a restriction aft of the inlet opening. The inlets ducts 22, 24 may also be designed and directed to create a co-swirl or neutral state at the fan face to help mitigate counter-swirl distortion creation. This system would allow for greater aircraft maneuverability without restrictions on the flight envelope compared to possible status quo configurations. This allows for optimization of response not present with a fan being embedded (without microjet flow control or tip injection). This allows the fan system to adapt to or endure in distortion patterns better than with a fan otherwise could and even perhaps better than some active technologies such as recirculation or similar tip injection schemes.

Typical flow control may not overcome a configuration with differing duct flows from multiple sources. Therefore, the aircraft 10 includes an inlet flow regulation system 16 having inlet flow regulators 26, 226, 326, 426, 526 in the inlet ducts 22, 24 to allow for differential flows and pressures to be mitigated between the different inlet ducts 22, 24 and bring more uniform distribution to the fan face.

The inlet flow regulators 26, 226, 326, 426, 526 in the inlet ducts 22, 24 ahead of a turbofan may help make the flows from different sources more uniform. By individually adjusting the inlet flow regulators 26, 226, 326, 426, 526, the inlet flow regulators 26, 226, 326, 426, 526 may help offset the distortion being experienced. By using the inlet flow regulators 26, 226, 326, 426, 526 to overcome the challenges of multiple inlets, the aircraft 10 may be more robust to angle of attack or side slip.

In the illustrative embodiments, the duct system 12 includes two inlet ducts 22, 24. In some embodiments, there may be one inlet duct 22, 24 on each lateral side of the aircraft 10 feeding to the fan 40.

In other embodiments, the duct system 12 may include three inlets with two on the each side of the aircraft 10 and one on top of the aircraft 10. In other embodiments, the duct system 12 may include four or more inlets (such as two vertically offset on each side of the aircraft 10). These flows may be comingled together and directed in a co-swirling directions to feed into the fan 40 with the least chance of negative aerodynamic or aeromechanical negative outcomes.

In some embodiments, the inlet flow regulation system 16 may allow for different and smaller inlets for the fan 40. These inlets may be low or near the flying wing's leading edge and work more effectively during upward angle of attack and other inlets may be on the upper surface of the aircraft 10 to be more effective on downward angle of attack.

Alternatively, there may be different inlets on the port versus starboard side of the aircraft 10, which may work more effectively for side slip, one inlet drawing in more direct flows while the other inlet would have less flow and more swirl being created. For example, the inlet flow regulation system 16 may allow the duct system 12 to include a primary inlet duct at the center or top of the aircraft 10 and two side ducts for high angles of side slip. Auxiliary inlets may be similar to the inlet flow regulator 526.

A conventional fan may be negatively affected with passages coming in from different surfaces of the aircraft 10 with different pressures and/or swirl. However, with the inlet flow regulation system 16 having individually adjustable inlet flow regulators 26, 226, 326, 426, 526 in the inlet ducts 22, 24, such inlet configuration may be possible. The inlet flow regulation system 16 may enable different inlet streams to be brought together to feed the fan 40 and may help maintain good flow in maneuvers (some openings would pull in more air while others would have less, instead of just one large one being affected).

In the illustrative embodiment, the inlet flow regulators 26, 226, 326, 426, 526 may also be configured to create a co-swirl or neutral state at the fan face to help mitigate counter-swirl distortion creation. The inlet flow regulation system 16 may allow for greater aircraft maneuverability without restrictions on the flight envelope compared to other aircraft configurations. The inlet flow regulation system 16 allows for optimization of response not present with a single fan being embedded.

The inlet flow regulation system 16 may improve survivability by replacing a single large inlet with multiple smaller ones. Alternatively, the aerodynamic interface plane (AIP) between the airframe and the engine may be modified to suit these multiple passages from the intake.

The inlet flow regulation system 16 also allows the fan 40 to adapt to or endure in distortion patterns better than a conventional fan otherwise could. The inlet flow regulation system 16 may also allow the fan 40 to adapt to or endure distortion patterns even better than some active technologies, such as recirculation or similar tip injection schemes.

Coordination between the airframe and fan design may select the number of inlets to optimize the fan's aeromechanical strengths, such as including 3-off inlets if the fan is robust to 3EO forcing (such as not having a crossing in the operating range of interest or having very low response to such). It may also be ideal to use higher prime numbers such as 5-off inlets, 7-off inlets, or even 11-off smaller inlets to average a smoother flow around the circumference of the fan and avoid forcing. One of many inlets may be split and the splits sent to non-adjacent fan sectors to create 7-off flow sectors with only 3-inlets, for example, by having a pair of inlets split into two sectors each and one inlet split into three sectors. This gives flexibility for the turbofan to be robust to new airframe designs which may have multiple inlets per engine (as simple a bifurcated or as complex as multiple inlets on a stealthier application). The AIP definition may need to adapt to the configuration, such that the transfer of ownership to the engine is moved forward and includes the passages.

The inlet flow regulators 26, 226, 326, 426, 526 may be dynamic and controlled by sensors and/or control logic, so as to adjust to different conditions or in anticipation of maneuvers, inputs, or programming. This may allow the turbofan to be simpler (less tailoring of it to distortion or without technologies such as tip injection or mistuning) with support of the inlet flow regulators 26, 226, 326, 426, 526 in the inlet ducts 22, 24 to aid in overcoming distortion.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An aircraft comprising:
   a duct system configured to receive a flow of air therethrough, the duct system including a main duct, a first inlet duct in fluid communication with the main duct, and a second inlet duct in fluid communication with the main duct, the first inlet duct and the second inlet duct each being arranged fluidly upstream of the main duct so as to conduct the flow of air from the first inlet duct and the second inlet duct into the main duct,
   a gas turbine engine in downstream fluid communication with the main duct, the gas turbine engine including a fan configured to push air to provide thrust for the gas turbine engine, a compressor configured to rotate about an axis of the gas turbine engine to compress at least a portion of the air that flows from the fan, a combustor configured to receive the compressed air from the compressor, and a turbine coupled to the compressor and configured to rotate about the axis of the gas turbine engine in response to receiving hot, high-pressure products of the combustor to drive the compressor,
   a flow regulation means for mechanically changing a shape of at least one of the first inlet duct and the second inlet duct, individually, so that the first inlet duct and the second inlet duct define different areas thereby changing an amount of the flow of air entering the first inlet duct and/or the second inlet duct in order to form a substantially uniform flow distribution through the main duct and into the fan so that stall in the gas turbine engine is managed, and
   a control unit in communication with the flow regulation means, the control unit configured to selectively adjust the flow regulation means based, at least in part, on a received input related to the duct system or the fan of the gas turbine engine,
   wherein the flow regulation means comprises an inlet flow regulator including a first portion coupled with a bottom wall of one of the first inlet duct and the second inlet duct and a second portion coupled with an axial forward end of the first portion, the inlet flow regulator being moveable relative to the one of the first inlet duct and the second inlet duct between (i) a normal flow position in which the first portion of the inlet flow regulator is substantially aligned with the bottom wall of the one of the first inlet duct and the second inlet duct and the second portion of the inlet flow regulator extends away from the first portion to form an obtuse angle therebetween and (ii) an increased flow position in which the first portion of the inlet flow regulator moves outwardly away from the bottom wall of the one of the first inlet duct and the second inlet duct so that the first portion and the second portion form a substantially straight line.

2. The aircraft of claim 1, wherein the control unit includes a controller and a plurality of sensors arranged to measure pressure, the controller is coupled to the plurality of sensors to receive pressure measurements from the plurality of sensors, and the controller is configured to adjust the flow regulation means based, at least in part, on the received pressure measurements.

3. The aircraft of claim 2, wherein the plurality of sensors includes a first total pressure boundary layer rake arranged in the first inlet duct and a second total pressure boundary layer rake arranged in the second inlet duct.

4. The aircraft of claim 2, wherein the plurality of sensors includes at least one first static pressure tap arranged in the first inlet duct and at least one second static pressure tap arranged in the second inlet duct.

5. The aircraft of claim 2, wherein the plurality of sensors comprises a plurality of pressure transducers arranged in the main duct axially forward of the fan.

6. The aircraft of claim 1, wherein the control unit includes a controller and a memory in communication with the controller, the memory including a plurality of preprogrammed aircraft maneuvers that each correspond to a predetermined adjustment of the flow regulation means, and the controller is configured to detect a preprogrammed aircraft maneuver included in the plurality of preprogrammed aircraft maneuvers on the memory and adjust the flow regulation means in response to detecting the preprogrammed aircraft maneuver.

7. The aircraft of claim 1, wherein the control unit is configured to receive an environmental input and the control unit is configured to selectively adjust the flow regulation means based, at least in part, on the environmental input, and wherein the environmental input includes information regarding crosswinds.

8. The aircraft of claim 1, wherein an axially forwardmost end of the first inlet duct defines a first inlet opening that receives the flow of air therethrough and an axially forwardmost end of the second inlet duct defines a second inlet opening that receives the flow of air therethrough.

9. An aircraft comprising:
a duct system including a main duct, a first inlet duct in fluid communication with the main duct, and a second inlet duct in fluid communication with the main duct, the first inlet duct and the second inlet duct each being arranged fluidly upstream of the main duct,
a gas turbine engine in downstream fluid communication with the main duct, and
an inlet flow regulation system including an inlet flow regulator configured to mechanically change a shape of the first inlet duct to change an amount of a flow of air entering the first inlet duct in order to form a substantially uniform flow distribution through the main duct and into the gas turbine engine and a control unit in communication with the inlet flow regulator and configured to selectively move the inlet flow regulator based, at least in part, on a received input related to the duct system or the gas turbine engine,
wherein the inlet flow regulator includes a first portion coupled with a bottom wall of the first inlet duct and a second portion coupled with an axial forward end of the first portion, the inlet flow regulator being moveable relative to the first inlet duct between (i) a normal flow position in which the first portion of the inlet flow regulator is substantially aligned with the bottom wall of the first inlet duct and the second portion of the inlet flow regulator extends away from the first portion to form an obtuse angle therebetween and (ii) an increased flow position in which the first portion of the inlet flow regulator moves outwardly away from the bottom wall of the first inlet duct so that the first portion and the second portion form a substantially straight line.

10. The aircraft of claim 9, wherein the control unit includes a controller and a plurality of sensors arranged to measure pressure, the controller is coupled to the plurality of sensors to receive pressure measurements from the plurality of sensors, and the controller is configured to move the inlet flow regulator based, at least in part, on the received pressure measurements.

11. The aircraft of claim 10, wherein the plurality of sensors includes a first total pressure boundary layer rake arranged in the first inlet duct and a second total pressure boundary layer rake arranged in the second inlet duct.

12. The aircraft of claim 10, wherein the plurality of sensors includes at least one first static pressure tap arranged in the first inlet duct and at least one second static pressure tap arranged in the second inlet duct.

13. The aircraft of claim 10, wherein the plurality of sensors comprises a plurality of pressure transducers arranged in the main duct axially forward of the gas turbine engine.

14. The aircraft of claim 9, wherein the control unit includes a controller and a memory in communication with the controller, the memory including a plurality of preprogrammed aircraft maneuvers that each correspond to a predetermined adjustment of the inlet flow regulator, and the controller is configured to detect a preprogrammed aircraft maneuver included in the plurality of preprogrammed aircraft maneuvers on the memory and adjust the inlet flow regulator in response to detecting the preprogrammed aircraft maneuver.

15. The aircraft of claim 9, wherein the control unit is configured to receive an environmental input and the control unit is configured to selectively adjust the inlet flow regulator based, at least in part, on the environmental input, and wherein the environmental input includes information regarding crosswinds.

16. The aircraft of claim 9, wherein an axially forwardmost end of the first inlet duct defines a first inlet opening that receives the flow of air therethrough and an axially forwardmost end of the second inlet duct defines a second inlet opening that receives the flow of air therethrough, and
wherein, while the inlet flow regulator is in the normal flow position, the first inlet opening has a first inlet area, and while the inlet flow regulator is in the increased flow position, the first inlet opening has a second inlet area greater than the first inlet area so that the flow of air directed through the first inlet opening is increased while the inlet flow regulator is in the increased flow position.

17. The aircraft of claim 9, wherein the first portion of the inlet flow regulator and the second portion of the inlet flow regulator are coupled together at the axial forward end of the first portion via a hinge so that the first portion and the second portion are moveable in relation to one another.

18. The aircraft of claim 9, wherein, while the inlet flow regulator is in the increased flow position, the first portion of the inlet flow regulator is not substantially aligned with the bottom wall of the first inlet duct.

* * * * *